US011477649B2

(12) United States Patent
Kennedy-Foster et al.

(10) Patent No.: US 11,477,649 B2
(45) Date of Patent: Oct. 18, 2022

(54) ACCESS CONTROL SYSTEM WITH TRUSTED THIRD PARTY

(71) Applicant: CARRIER CORPORATION, Jupiter, FL (US)

(72) Inventors: Ashley Kennedy-Foster, Henrietta, NY (US); Ben Holm, Farmington, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 170 days.

(21) Appl. No.: 16/477,100

(22) PCT Filed: Jan. 19, 2018

(86) PCT No.: PCT/US2018/014429
§ 371 (c)(1),
(2) Date: Jul. 10, 2019

(87) PCT Pub. No.: WO2018/136740
PCT Pub. Date: Jul. 26, 2018

(65) Prior Publication Data
US 2019/0357050 A1    Nov. 21, 2019

Related U.S. Application Data

(60) Provisional application No. 62/449,393, filed on Jan. 23, 2017.

(51) Int. Cl.
*H04W 12/084* (2021.01)
*H04L 9/40* (2022.01)
(Continued)

(52) U.S. Cl.
CPC ....... *H04W 12/084* (2021.01); *H04L 63/0853* (2013.01); *H04L 63/0861* (2013.01);
(Continued)

(58) Field of Classification Search
CPC ............. H04L 63/0861; H04L 63/0892; H04L 63/0853; H04W 12/06; H04W 12/66; H04W 12/72
See application file for complete search history.

(56) References Cited

U.S. PATENT DOCUMENTS

| 6,035,406 A | 3/2000 | Moussa et al. |
| 7,983,979 B2 | 7/2011 | Holland |

(Continued)

FOREIGN PATENT DOCUMENTS

| CN | 202904698 U | 4/2013 |
| CN | 102769623 B | 3/2014 |

(Continued)

OTHER PUBLICATIONS

S. Gimenez Ocano, B. Ramamurthy and Y. Wang, "Remote mobile screen (RMS): An approach for secure BYOD environments," 2015 International Conference on Computing, Networking and Communications (ICNC), 2015, pp. 52-56. (Year: 2015).*

(Continued)

*Primary Examiner* — Kari L Schmidt
(74) *Attorney, Agent, or Firm* — Cantor Colburn LLP

(57) ABSTRACT

An access control system is provided and includes a control device disposed to restrict access to a secured resource and a networked device disposed in signal communication with the control device. The networked device requests authentication of a user from a trusted device responsive to a presentation of credentials to the control device in a request for access to the secured resource, the credentials are associated with access rights of the user, the networked device is receptive of the authentication, and the control device permits a level of access to the secured resource in accordance with the access rights upon the reception of the authentication.

15 Claims, 4 Drawing Sheets

(51) Int. Cl.
  *H04W 12/06* (2021.01)
  *H04W 12/60* (2021.01)
  *H04W 12/72* (2021.01)
(52) U.S. Cl.
  CPC ........... *H04W 12/06* (2013.01); *H04W 12/66* (2021.01); *H04W 12/72* (2021.01)

(56) References Cited

U.S. PATENT DOCUMENTS

| | | | |
|---|---|---|---|
| 8,065,712 B1* | 11/2011 | Cheng | H04L 63/105 |
| | | | 726/4 |
| 8,458,465 B1 | 6/2013 | Stern et al. | |
| 8,590,013 B2* | 11/2013 | Crawford | G05B 9/02 |
| | | | 726/3 |
| 8,863,252 B1* | 10/2014 | Katzer | H04W 12/128 |
| | | | 709/224 |
| 8,973,122 B2 | 3/2015 | Beck et al. | |
| 9,058,702 B2* | 6/2015 | Chao | H04W 4/50 |
| 9,076,273 B2* | 7/2015 | Smith | G07C 9/20 |
| 9,292,985 B2* | 3/2016 | Ahearn | G07C 9/00309 |
| 9,323,912 B2 | 4/2016 | Schultz et al. | |
| 9,501,881 B2* | 11/2016 | Saeedi | G07C 9/257 |
| 9,652,917 B2* | 5/2017 | Johnson | E05B 47/00 |
| 9,946,857 B2* | 4/2018 | Beals | H04L 63/101 |
| 10,218,697 B2* | 2/2019 | Cockerill | H04L 63/105 |
| 10,492,066 B2* | 11/2019 | Tarmey | G07C 9/00571 |
| 10,581,844 B2* | 3/2020 | Kyllonen | G06K 9/00288 |
| 2005/0138394 A1 | 6/2005 | Poinsenet | |
| 2006/0047859 A1* | 3/2006 | Cavalaris | G06F 9/4411 |
| | | | 710/8 |
| 2006/0136741 A1 | 6/2006 | Mercredi | |
| 2007/0107050 A1 | 5/2007 | Selvarajan | |
| 2007/0216764 A1* | 9/2007 | Kwak | G07C 9/00309 |
| | | | 348/14.06 |
| 2009/0138953 A1* | 5/2009 | Lyon | G06Q 20/04 |
| | | | 726/9 |
| 2010/0100945 A1 | 4/2010 | Ozzie et al. | |
| 2010/0246902 A1 | 9/2010 | Rowe et al. | |
| 2012/0268243 A1* | 10/2012 | Kappeler | G07C 9/22 |
| | | | 340/5.61 |
| 2012/0280783 A1* | 11/2012 | Gerhardt | H04W 12/08 |
| | | | 340/5.6 |
| 2013/0081119 A1 | 3/2013 | Sampas | |
| 2013/0117078 A1* | 5/2013 | Weik, III | E05F 15/70 |
| | | | 705/13 |
| 2013/0214898 A1* | 8/2013 | Pineau | H04L 63/101 |
| | | | 340/5.6 |
| 2013/0214902 A1* | 8/2013 | Pineau | G05B 1/00 |
| | | | 340/5.61 |
| 2013/0262873 A1 | 10/2013 | Read et al. | |
| 2013/0307670 A1 | 11/2013 | Ramaci | |
| 2014/0049361 A1* | 2/2014 | Ahearn | G07C 9/00309 |
| | | | 340/5.7 |
| 2014/0337930 A1* | 11/2014 | Hoyos | G06F 21/34 |
| | | | 726/4 |
| 2015/0050922 A1* | 2/2015 | Ramalingam | H04W 4/50 |
| | | | 455/418 |
| 2015/0120471 A1 | 4/2015 | Cooke et al. | |
| 2015/0358315 A1 | 12/2015 | Cronin | |
| 2016/0055689 A1* | 2/2016 | Raina | G07C 9/15 |
| | | | 340/5.7 |
| 2016/0217277 A1 | 7/2016 | Johnston | |
| 2016/0335819 A1* | 11/2016 | Lingan | G07C 9/28 |
| 2016/0337508 A1* | 11/2016 | Roy | H04W 12/37 |
| 2016/0337863 A1* | 11/2016 | Robinson | H04W 4/021 |
| 2016/0366181 A1* | 12/2016 | Smith | G06F 21/6236 |
| 2017/0053467 A1* | 2/2017 | Meganck | G07C 9/00563 |
| 2017/0063549 A1* | 3/2017 | Zwart | G07C 9/257 |
| 2017/0103647 A1* | 4/2017 | Davis | H04W 12/082 |
| 2017/0161978 A1* | 6/2017 | Wishne | G07F 17/14 |
| 2017/0244712 A1* | 8/2017 | Meredith | H04L 63/101 |
| 2017/0289147 A1* | 10/2017 | Kyllonen | G06F 21/32 |
| 2018/0108192 A1* | 4/2018 | Ho | H04L 67/125 |
| 2018/0174076 A1* | 6/2018 | Fukami | H04W 12/06 |
| 2019/0043289 A1* | 2/2019 | Cahill | G07C 9/00309 |

FOREIGN PATENT DOCUMENTS

| | | |
|---|---|---|
| CN | 104376621 A | 2/2015 |
| CN | 204731851 U | 10/2015 |
| CN | 105869243 A | 8/2016 |
| CN | 105956678 A | 9/2016 |
| TW | 201638890 A | 11/2016 |
| WO | 2016036661 A1 | 3/2016 |
| WO | 2016070295 A1 | 5/2016 |
| WO | 2016089832 A1 | 6/2016 |

OTHER PUBLICATIONS

Oluwatimi, Oyindamola, and Elisa Bertino. "An application restriction system for bring-your-own-device scenarios." Proceedings of the 21st ACM on Symposium on Access Control Models and Technologies. 2016, pp. 25-36. (Year: 2016).*

IPRP Application No. PCT/US2018/014429, dated Aug. 1, 2019, pp. 11.

Epstein, "You can now use Touch ID on your iPhone to sign in to your Google account anywhere", Online Retrieved URL<https://bgr.com/2016/06/21/google-2-step-verification-touch-id-iphone/>, 7 pages.

ISR/WO, dated Jul. 13, 2018, PCT Application No. PCT/US2018/014429, 17 pages total.

Styles, "LastPass Authenticator Makes Two-Factor Easy", 2016, Online Retrieved URL<https://blog.lastpass.com/2016/03/lastpass-authenticator-makes-two-factor-easy.html/>, 5 pages.

Office Action issued in Chinese Application No. 201880008079.9; Application Filing Date Jan. 19, 2018; dated Jul. 25, 2022 (14 pages).

* cited by examiner

_US 11,477,649 B2_

ACCESS CONTROL SYSTEM WITH TRUSTED THIRD PARTY

BACKGROUND

The following description relates to access control systems and, more particularly, to an access control system with trusted third party for both reader-based or reader-less access control devices.

Access control systems generally operate by encoding data on a physical key card that is indicative of certain access rights held by the authorized holder of that key card. Some access control systems are generally operated in an online mode where readers communicate with centralized server of the access control system via a network to determine whether or not to grant access to a user presenting such a key card. In such online systems, the access rights are often a reference identifier or some other similar element. Other access control systems are offline with access rights encoded as data that can be decoded and interpreted by offline locks to retrieve access rights when the user presents the key card. An example is a hotel locking system in which a front desk worker encodes a guest card and an offline, battery powered lock on a guest room door decodes the key card when the guest approaches his assigned guest room door and presents the guest card to the reader on the door lock. Here, the reader on the door lock reads the data encoded on the guest card, decodes the data and permits or denies access based on rights associated with the decoded data.

Access control systems, such as the exemplary hotel system described above, can have issues with individuals finding a guest or key card and then posing as the authorized guest to obtain access to areas within the hotel that they would not normally be able to access (e.g., the authorized guest's assigned guest room). Thus, current solutions have been proposed in which access control systems employ two-factor authentication or biometric verification features. These features require that the holder of a guest or key card who presents the guest or key card to a reader be authenticated as the authorized holder or user of the guest or key card before access to a secured resource is granted. The features thus require hardware and software, such as virtual private network (VPN) tokens or fingerprint/retina scanners, in addition to a data store for sensitive information as well as a business workflow system that captures, audits and maintains the sensitive information as data. This raises privacy and liability concerns in many markets and is associated with substantial build and maintenance costs.

BRIEF DESCRIPTION

According to one aspect of the disclosure, an access control system is provided and includes a control device disposed to restrict access to a secured resource and a networked device disposed in signal communication with the control device. The networked device requests authentication of a user from a trusted device responsive to a presentation of credentials to the control device in a request for access to the secured resource, the credentials are associated with access rights of the user, the networked device is receptive of the authentication, and the control device permits a level of access to the secured resource in accordance with the access rights upon the reception of the authentication.

In accordance with additional or alternative embodiments, the control device includes a door lock.

In accordance with additional or alternative embodiments, the networked device includes a server.

In accordance with additional or alternative embodiments, the trusted device includes a portable computing device.

In accordance with additional or alternative embodiments, the trusted device includes a smart phone.

In accordance with additional or alternative embodiments, the credentials are presentable as a card or badge.

In accordance with additional or alternative embodiments, the authentication is alphanumeric or biometric.

In accordance with additional or alternative embodiments, the data relating to authentication of the user is stored remotely from the control and networked devices.

In accordance with another aspect of the disclosure, an access control system is provided. The access control system includes a control device, which is disposed to restrict access to a secured resource, and a networked device. The networked device is disposed in signal communication with the control device and is configured to distribute an authentication application to a trusted device of a user to whom credentials for access rights are granted. The networked device requests that the trusted device authenticate the user by executing the authentication application in response to a presentation of the credentials to the control device in a request for access to the secured resource and is receptive of a positive or negative indication of the authentication of the user from the trusted device. The control device permits a level of access to the secured resource in accordance with the access rights upon the reception of the positive indication of the authentication by the networked device.

In accordance with additional or alternative embodiments, the control device includes a door lock.

In accordance with additional or alternative embodiments, the networked device includes a server.

In accordance with additional or alternative embodiments, the trusted device includes a portable computing device.

In accordance with additional or alternative embodiments, the trusted device includes a smart phone.

In accordance with additional or alternative embodiments, the credentials are presentable as a card or badge.

In accordance with additional or alternative embodiments, the authentication application requires alphanumeric or biometric authentication.

In accordance with additional or alternative embodiments, data relating to the alphanumeric or biometric authentication is stored remotely from the control and networked devices.

According to yet another aspect of the disclosure, a method of operating an access control system is provided. The method includes receiving, at a control device disposed to restrict access to a secured resource, a presentation of credentials in a request for access to the secured resource, recognizing that the credentials are associated with access rights of a user, requesting an authentication of the user from a trusted device and permitting a level of access to the secured resource in accordance with the access rights upon reception of the authentication.

In accordance with additional or alternative embodiments, the method further includes issuing the credentials to the user.

In accordance with additional or alternative embodiments, the method further includes distributing an authentication application to the trusted device.

In accordance with additional or alternative embodiments, the authentication application requires alphanumeric or biometric authentication and data relating to the alphanumeric or biometric authentication is stored remotely from the access control system.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, an access control system is provided in which users use their portable computing devices or phones to authenticate their own identification in order to obtain access to a secured resource with a credential. The administrator of the access control system can choose to trust specific third-party authenticators or biometric verification applications, both of which are commonly available on portable computing devices or phones. The access control system can complement traditional access control systems with features, such as door readers and other similar access control devices. That is, when a person requesting access to a secured resource presents their badge to a reader of a door lock which normally prevents such access, the access control system sends a request for authentication to the authorized badge-holder's portable computing device or phone (whichever has been identified as being trustworthy beforehand). If the authorized badge-holder is the person requesting the access, he/she uses an authenticated or biometrically-locked application stored on the portable computing device or phone to confirm that they have just requested access to the door (i.e., to authenticate themselves) so as to verify that the person presenting the badge is also the owner of the portable computing device or phone and is also the authorized badge-holder. On the other hand, if the authorized badge-holder is not the person requesting the access, it will be relatively easy to determine that the person requesting the access may be doing so improperly.

Figure 1:
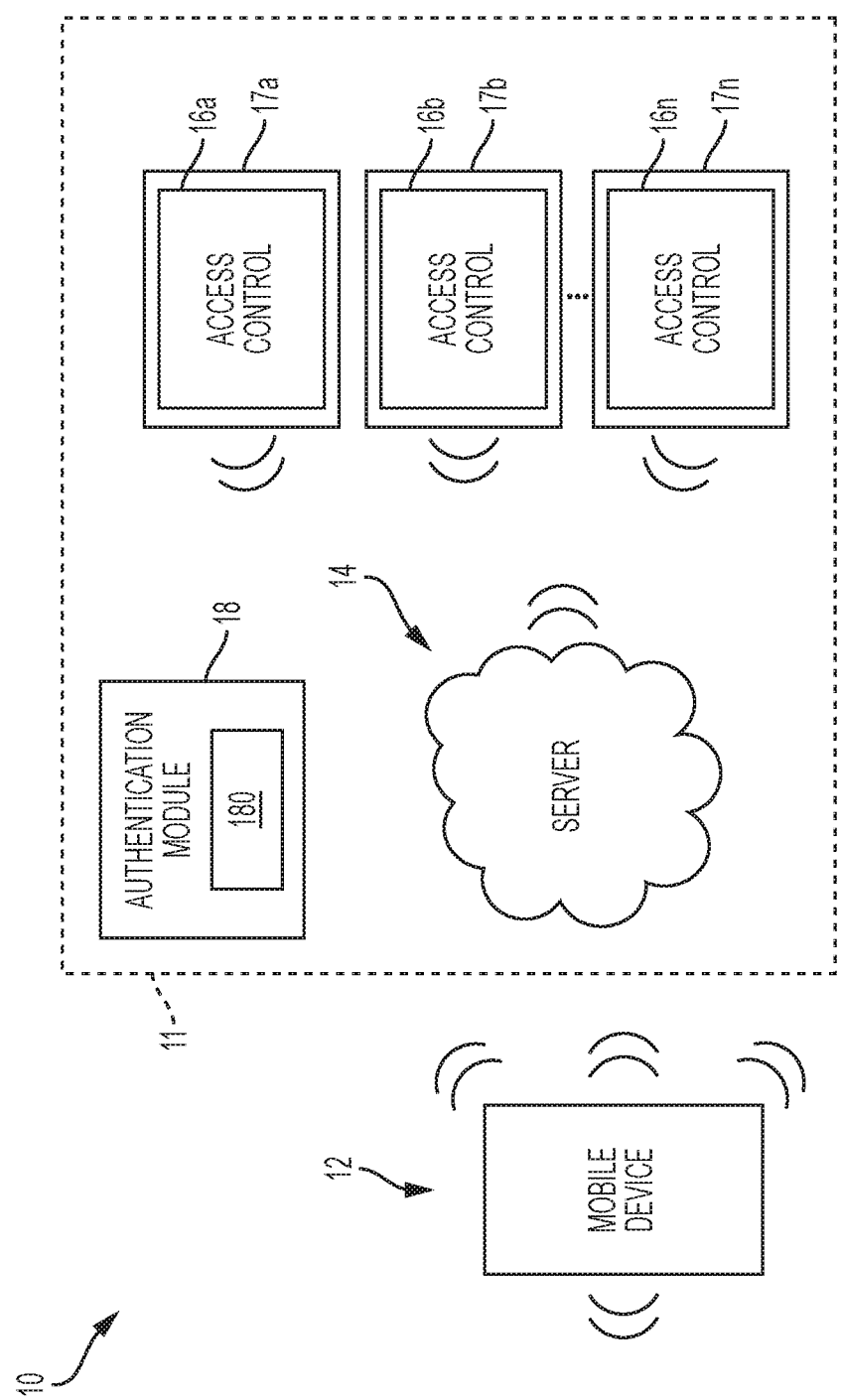
FIG. 1 is a schematic illustration of an access control system in accordance with embodiments.

With reference to FIG. 1, an access control system 10 is provided and may be deployed in a building 11, such as a hotel or an office building, for interaction with a mobile device 12. The access control system 10 includes a server 14, a plurality of access control devices 16a, 16b, . . . , 16n, a corresponding plurality of secured resources 17a, 17b, . . . , 17n and, in some cases, an authentication module 18.

The mobile device 12 may be a wireless capable handheld device, such as a portable computing device, a tablet or a smartphone, which is operable to communicate with the server 14, the access control devices 16a, 16b, . . . , 16n and/or the authentication module 18.

The server 14 may provide for the generation of access credentials and other encoded or non-encoded data which can be communicated or presented to one or more of the access control devices 16a, 16b, . . . , 16n in order to obtain access to one or more of the secured resources 17a, 17b, . . . , 17n. Although the server 14 is depicted as a single device, the server 14 may be embodied as multiple systems. Each of the access control devices 16a, 16b, . . . , 16n may be a wireless-capable, restricted-access or restricted-use device such as a wireless lock, an access control reader for building or room entry, an electronic banking control, a data transfer device, a key dispenser device, a tool dispensing device, elevator kiosks, vehicle control systems and/or another restricted-use machine. As such, each of the access control devices 16a, 16b, . . . , 16n may be disposed to restrict access to a corresponding one of the secured resources 17a, 17b, . . . , 17n. That is, the access control device 16a may be provided as a door lock and the secured resource 17a may be provided as a guest room. The authentication module 18 may be provided as a Bluetooth™ module 180.

Figure 2:
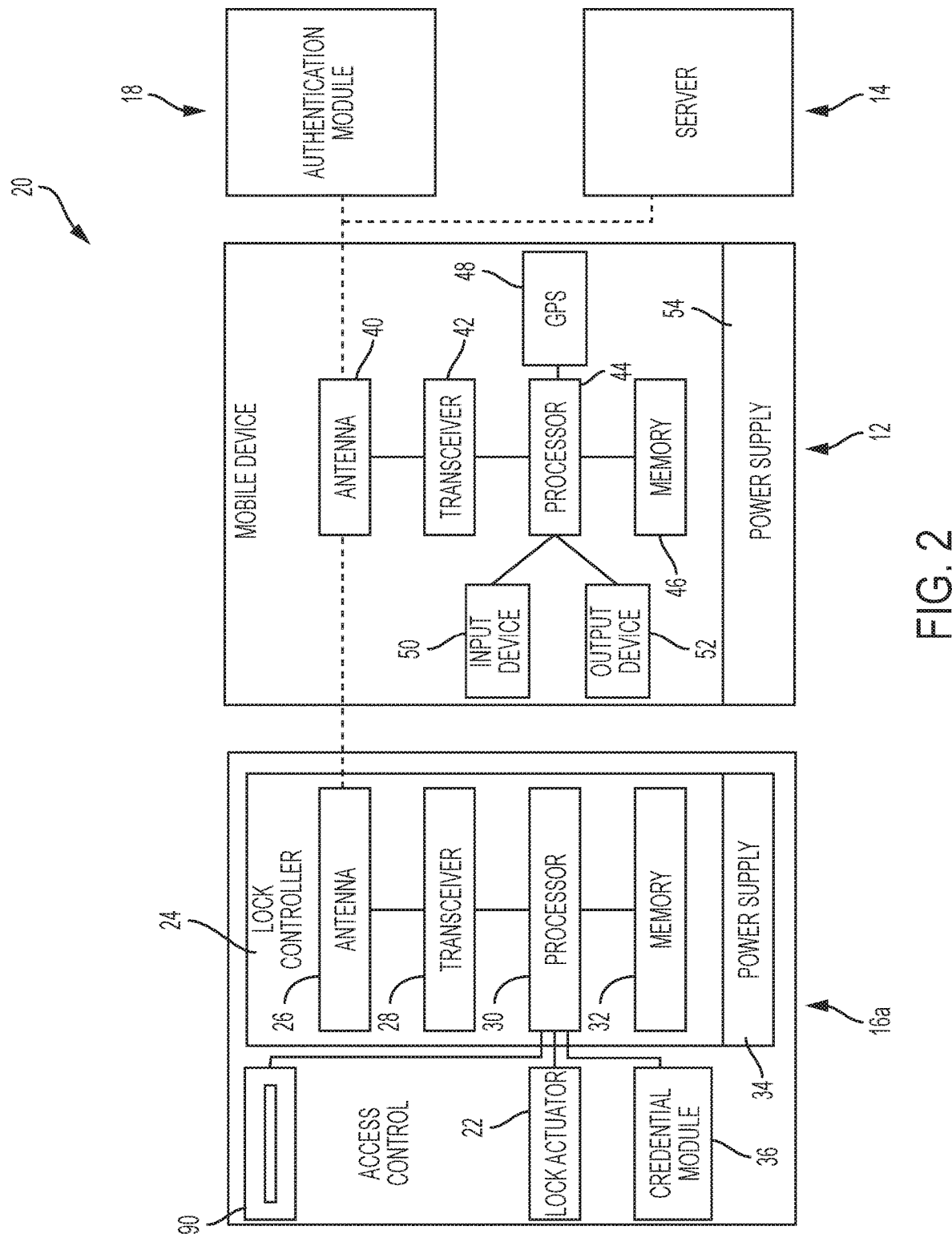
FIG. 2 is a schematic illustration of components of the access control system of FIG. 1.

With reference to FIG. 2, a block diagram of an access control system 20 is provided for interaction with the mobile device 12. As shown in FIG. 2, the access control system 20 includes the access control device 16a, which in this case is a door lock, the server 14 and the authentication module 18. The access control device 16a generally includes a lock actuator 22, a lock controller 24, a lock antenna 26, a lock transceiver 28, a lock processor 30, a lock memory 32, a lock power supply 34 and a lock card reader 90 and may further include a credential module 36. The access control device 16a is capable of responding to the presentation of proper credentials by unlocking a door to a guest room.

In a typical operation, the authentication module 18 or the credential module 36 determines that credentials which are presented to the lock card reader 90 are improper or proper whereupon the lock controller 24 commands the lock actuator 22 to maintain a locked condition or to unlock a mechanical or electronic lock. The lock controller 24 and the lock actuator 22 may be parts of a single electronic or electromechanical lock unit or may be components sold or installed separately. The lock transceiver 28 is capable of transmitting and receiving data to and from at least the mobile device 12, the server 14 and the authentication module 18. The lock transceiver 28 may, for instance, be a near field communication (NFC) device, a Bluetooth™ module, a Wi-Fi transceiver or another appropriate wireless transceiver. The lock antenna 26 may be any antenna appropriately coupled to the lock transceiver 28. The lock processor 30 and lock memory 32 are, respectively, data processing and storage devices. The lock processor 30 may, for instance, be a microprocessor that can process instructions to validate card data and determine access rights contained in the card data or to pass messages from a transceiver to the credential module 36 and to receive a response indication back from the credential module 36 with card data. The lock memory 32 may be RAM, EEPROM or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system or a battery that powers the lock controller 24. In other embodiments, the lock power supply 34 may only power the lock controller 24, with the lock actuator 22 powered primarily or entirely by another source, such as user work (e.g. turning a bolt).

The authentication module 18 and the credential module 36 may be disposed in communication with the lock processor 30 and are operable to decrypt and validate a credential to extract virtual card data communicated into the lock controller 24 as a "virtual card read."

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module 36 or the credential module 36 may have a transceiver 28 and antenna 26 separately from the processor 30 which also has a separate transceiver 28 and antenna 26 of the same type of different. In some embodiments, the processor 30 may route communication received via transceiver 28 to the credential module 36. In other embodiments, the credential module 36 may be embodied as a software module that is wholly or partially executed within the processor 30.

In accordance with embodiments, the mobile device 12 can include a key antenna 40, a key transceiver 42, a key processor 44, a key memory 46, a GPS receiver 48, an input device 50, an output device 52 and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14, the authentication module 18 and the credential module 36. In other embodiments, one or more separate transceivers and antennas may be included to communicate with the server 14, the authentication module 18 and the credential module 36. The key memory 46 may store various types of alphanumeric or biometric data.

Therefore, with continued reference to FIGS. 1 and 2, an access control system 20 is provided and includes an access control device 16a and a networked device, such as the server 14 (hereinafter referred to as "the networked device 14"). The access control device 16a may be provided as a door lock for a guest room in a hotel, for example, and is disposed to restrict access to secured resource 17a. The secured resource 17a may be provided as the guest room itself. The networked device 14 is disposed in signal communication with the access control device 16a and is configured to distribute an authentication application to a trusted device of a user to whom credentials for access rights are granted by one or more systems (e.g., the networked device 14). The trusted device may be provided as a portable computing device or as a phone, such as the mobile device 12 discussed above, and will hereinafter be referred to as "the trusted device 12."

The authentication application may be provided as an alphanumeric or biometric authentication application and may be stored on the key memory 46 or any other memory unit of the trusted device 12. Thus, while the data associated with the alphanumeric or biometric identification may be substantially large especially in the case of the biometric data, the access control system 20 need not include memory or storage capability sufficient to store and maintain every instance of the alphanumeric or biometric identification data on its own.

In accordance with embodiments, the administrator of the access control system 20 can determine for themselves what type of devices will qualify as the trusted device 12. Such qualifications may be based on available levels of security in the devices under consideration and the portability of the devices. The credentials can be any type of access rights credentials and are associated with the user, if the user is indeed authorized to obtain access to the secured resource 17a, for a given period of time. For purposes of clarity and brevity, the credentials will be assumed to be encoded data on a key card that is issued to the user and which the user has to present to the lock card reader 90 in order to obtain access to the secured resource 17a. Alternatively, the credentials may be assumed to be encoded data that is stored on the trusted device 12, in which case the trusted device 12 is used to request and obtain the access to the secured resource 17a.

In an operation of the access control system 20, when the credentials are presented as the key card to the lock card reader 90 of the access control device 16a by a person (this person may be the user who is authorized to use the key card or another person that is not so authorized), the networked device 14 issues a request to the trusted device 12 to verify that the person is actually the user. The trusted device 12 does this by an execution of the authentication application which will authenticate the user or otherwise validate that the person is the user or which will indicate that an unauthorized attempt to secure access is being made. In accordance with embodiments, the authentication application may request an alphanumeric password from the user or request that the user submit a biometric identification (e.g., a fingerprint or a voiceprint) into the trusted device 12. If the person presenting the credentials is the user, the user will proceed to enter the alphanumeric password or to submit the biometric identification into the trusted device 12 in order to complete and satisfy the authentication application. When this happens, the trusted device will send an affirmative identification signal to the networked device 14 which will then communicate an unlock signal to the access control device 16a. On the other hand, if the person presenting the credentials is not the user, the user may recognize that a request for unauthorized access is being attempted from the request to enter the alphanumeric password or to submit the biometric identification. Here, the user may simply refuse to comply or take some level of appropriate action. Meanwhile, since no affirmative identification signal will have been received by the networking device 14 (or if a negative identification signal is received), the networking device 14 will instruct the access control device 16a to maintain a locked condition and the access control device 16a will not permit the person presenting the credentials to obtain the requested access.

When the credentials are presented as the trusted device 12 to the lock card reader 90, the networked device 14 again issues a request to the trusted device 12 to verify that the person is actually the user. As above, the trusted device 12 does this by executing the authentication application which may request the alphanumeric password from the user or the submission of the biometric identification into the trusted device 12. If the person presenting the credentials is the user, the user will proceed to enter the alphanumeric password or to submit the biometric identification into the trusted device 12 in order to complete and satisfy the authentication application thus resulting in the affirmative identification signal and the unlock instruction. On the other hand, if the person presenting the credentials is not the user, the user will not know a request for unauthorized access is being attempted since he is not in possession of his phone but the person presenting the credentials will not be able to complete and satisfy the authentication application. Thus, no affirmative identification signal will be received (or a negative identification signal will be received), the access control device 16a will be instructed to maintain the locked condition and will not permit the person presenting the credentials to obtain the requested access.

At this point, it is to be understood that the access control device 16a will only permit the person presenting the credentials to obtain the requested access in accordance with the access rights associated with the credentials even if the person presenting the credentials is authenticated or has his/her identity otherwise verified. That is, if the person presenting his own authorized credentials is authenticated but is attempting to obtain access to a restricted area in a hotel (e.g., another person's guest room or the hotel manager's office), the corresponding access control device 16a will refuse to permit the requested access.

The access control system according to claim 15, wherein data relating to the alphanumeric or biometric authentication is stored remotely from the control and networked devices.

Figure 3:
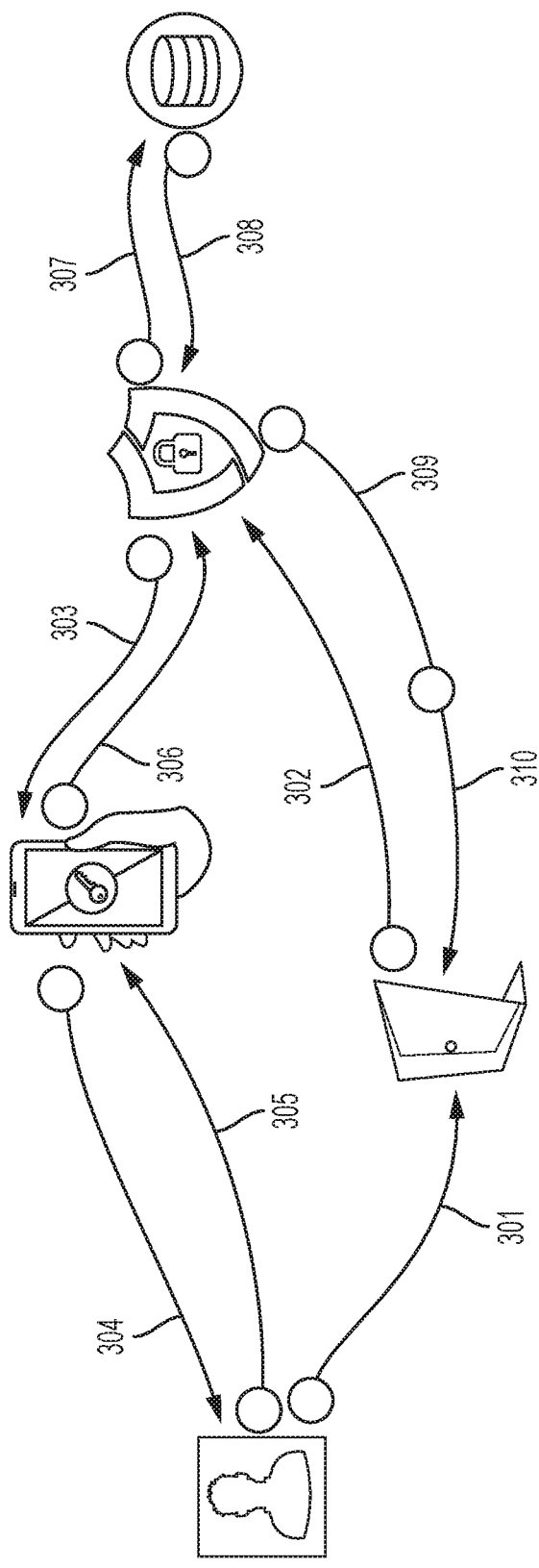
FIG. 3 is a flow diagram illustrating an operation of an access control system in accordance with embodiments.
Figure 4:
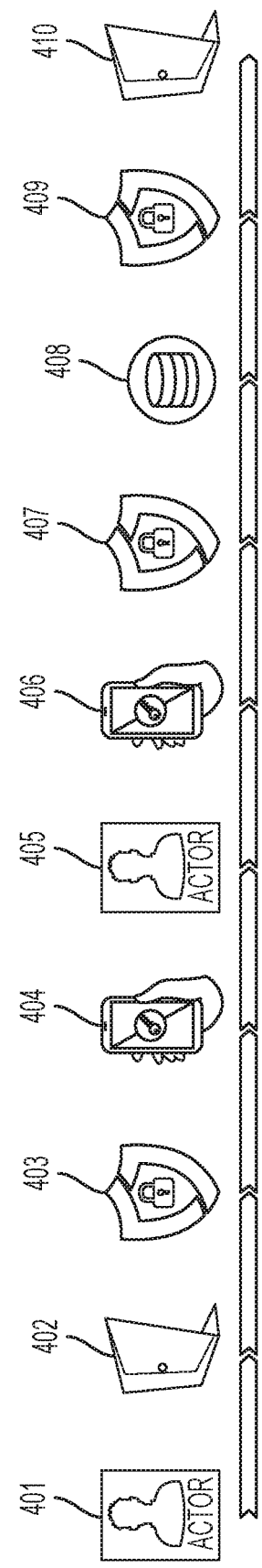
FIG. 4 is a flow diagram illustrating the operation of FIG. 3 in a different manner.

With reference to FIGS. 3 and 4, the operational case of the access control system 20 in which the credentials are presented as the key card to the lock card reader 90 of the access control device 16a is illustrated. As shown in FIGS. 3 and 4, an actor presents a physical badge to the lock card reader 90 (301 in FIGS. 3 and 401 in FIG. 4) whereupon the access control device 16a requests access instructions from the access control system 20 or, more particularly, from the networked device 14 (302 in FIGS. 3 and 402 in FIG. 4). At this point, the networked device 14 requests identity verification from the trusted device 12 (303 in FIGS. 3 and 403 in FIG. 4), the trusted device 12 responsively executes the authentication application (304 in FIGS. 3 and 404 in FIG. 4) and the actor either confirms his identity alphanumerically or biometrically or fails to do so (305 in FIGS. 3 and 405 in FIG. 4). If the actor confirms, the trusted device 12 provides the actor's identity and an authorization confirmation to the networked device 14 (306 in FIGS. 3 and 406 in FIG. 4). Subsequently, the networked device 14 queries an access database for the actor's identity (307 in FIGS. 3 and 407 in FIG. 4), receives access control data (308 in FIGS. 3 and 408 in FIG. 4) and determines whether the actor has permission to obtain the requested access (309 in FIGS. 3 and 409 in FIG. 4). If so, the networked device 14 instructs the access control device 16a to permit the requested access and the access control device 16a complies (310 in FIGS. 3 and 410 in FIG. 4).

Figure 5:
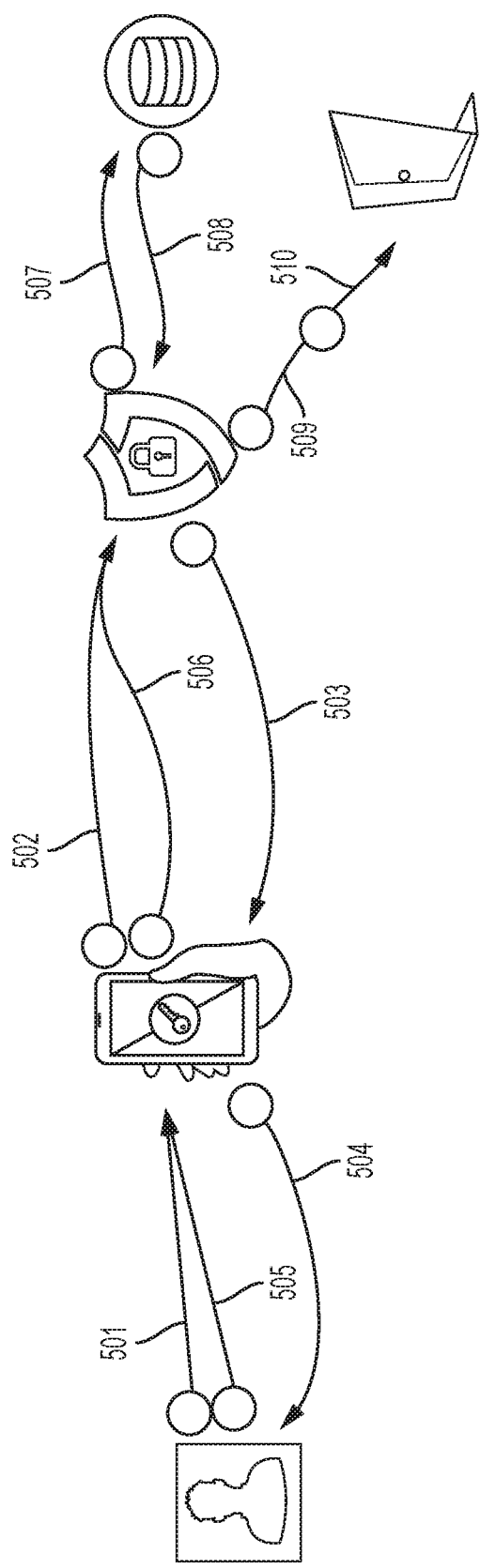
FIG. 5 is a flow diagram illustrating an operation of an access control system in accordance with embodiments.
Figure 6:
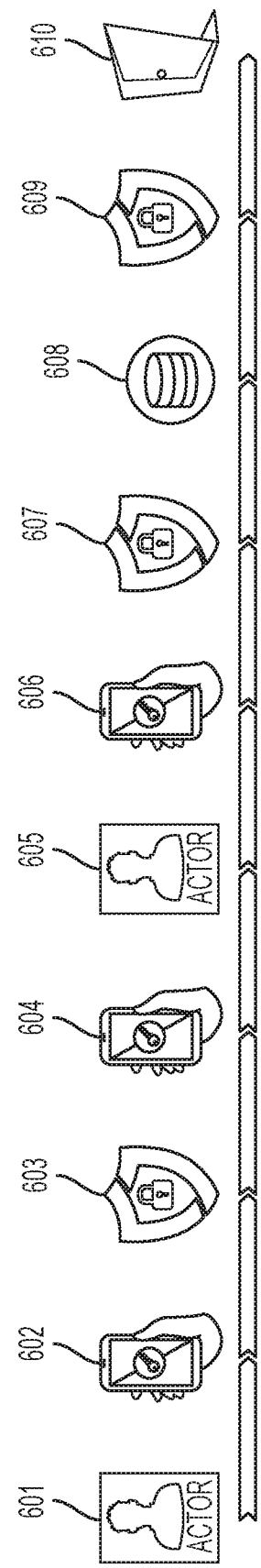
FIG. 6 is a flow diagram illustrating the operation of FIG. 5 in a different manner.

With reference to FIGS. 5 and 6, the operational case of the access control system 20 in which the credentials are presented using the trusted device 12 is illustrated. As shown in FIGS. 5 and 6, an actor requests access using the trusted device 12 (501 in FIGS. 5 and 601 in FIG. 6) whereupon the access control device 16a requests access instructions from the access control system 20 or, more particularly, from the networked device 14 (502 in FIGS. 5 and 602 in FIG. 6). At this point, the networked device 14 requests identity verification from the trusted device 12 (503 in FIGS. 5 and 603 in FIG. 6), the trusted device 12 responsively executes the authentication application (504 in FIGS. 5 and 604 in FIG. 6) and the actor either confirms his identity alphanumerically or biometrically or fails to do so (505 in FIGS. 5 and 605 in FIG. 6). If the actor confirms, the trusted device 12 provides the actor's identity and an authorization confirmation to the networked device 14 (506 in FIGS. 5 and 606 in FIG. 6). Subsequently, the networked device 14 queries an access database for the actor's identity (507 in FIGS. 5 and 607 in FIG. 6), receives access control data (508 in FIGS. 5 and 608 in FIG. 6) and determines whether the actor has permission to obtain the requested access (509 in FIGS. 5 and 609 in FIG. 6). If so, the networked device 14 instructs the access control device 16a to permit the requested access and the access control device 16a complies (510 in FIGS. 5 and 610 in FIG. 6).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An access control system, comprising:
a control device disposed to restrict access to a secured resource; and
a networked device disposed in signal communication with the control device and configured to distribute an authentication application to a trusted device of a user, wherein:
the networked device requests authentication of the user from the trusted device responsive to a presentation of credentials by the user to the control device in a request for access to the secured resource, the trusted device being separate from the networked device, communicative with the control device and the networked device and configured to execute the authentication application to authenticate the user,
the credentials are associated with access rights of the user,
the networked device is receptive of the authentication, and
the control device permits a level of access to the secured resource in accordance with the access rights upon the reception of the authentication,
wherein:
the trusted device comprises a portable computing device configured to execute the authentication application to authenticate the user and to send an affirmative identification signal to the networked device upon the user being authenticated as the authentication, and
the trusted device is a type of device that is qualified as a trusted device by an administrator of the access control system based on available levels of security in the trusted device and based on a portability of the trusted device.

2. The access control system according to claim 1, wherein the control device comprises a door lock.

3. The access control system according to claim 2, wherein the networked device comprises a server.

4. The access control system according to claim 1, wherein the credentials are presentable as a card or badge.

5. The access control system according to claim 1, wherein the authentication is alphanumeric or biometric.

6. The access control system according to claim 1, wherein data relating to authentication of the user is stored remotely from the control and networked devices.

7. An access control system, comprising:
a control device, which is disposed to restrict access to a secured resource; and
a networked device, which is disposed in signal communication with the control device and configured to distribute an authentication application to a trusted device of a user to whom credentials for access rights are granted, wherein:

the trusted device is separate from the networked device and is communicative with the control device and the networked device, the networked device requests that the trusted device authenticate the user by executing the authentication application in response to a presentation of the credentials to the control device in a request for access to the secured resource, the networked device is receptive of a positive or negative indication of the authentication of the user from the trusted device, and the control device permits a level of access to the secured resource in accordance with the access rights upon the reception of the positive indication of the authentication by the networked device, wherein:

the trusted device comprises a portable computing device configured to execute the authentication application to authenticate the user and to send an affirmative identification signal to the networked device upon the user being authenticated as the positive or negative indication of the authentication of the user, and the trusted device is a type of device that is qualified as a trusted device by an administrator of the access control system based on available levels of security in the supposedly trusted device and based on a portability of the trusted device.

8. The access control system according to claim 7, wherein the control device comprises a door lock.

9. The access control system according to claim 8, wherein the networked device comprises a server.

10. The access control system according to claim 7, wherein the credentials are presentable as a card or badge.

11. The access control system according to claim 7, wherein the authentication application requires alphanumeric or biometric authentication.

12. The access control system according to claim 11, wherein data relating to the alphanumeric or biometric authentication is stored remotely from the control and networked devices.

13. A method of operating an access control system, the method comprising:

receiving, at a control device disposed to restrict access to a secured resource, a presentation of credentials in a request for access to the secured resource;

recognizing that the credentials are associated with access rights of a user;

distributing, by a networked device and to a trusted device of a user, an authentication application to authenticate the user, the trusted device being separate from the networked device and communicative with the control device and the networked device;

requesting, by the networked device, an authentication of the user from a trusted device by an execution of the authentication application; and permitting a level of access to the secured resource in accordance with the access rights upon reception of an affirmative indication of the authentication from the trusted device by the networked device, wherein:

the trusted device comprises a portable computing device configured to execute the authentication application and to send an affirmative identification signal to the networked device upon the user being authenticated as the positive or negative indication of the authentication of the user, and the method further comprises qualifying the trusted device as a trusted device by an administrator of the access control system based on available levels of security in the supposedly trusted device and based on a portability of the trusted device.

14. The method according to claim 13, further comprising issuing the credentials to the user.

15. The method according to claim 13, wherein:

the authentication application requires alphanumeric or biometric authentication, and data relating to the alphanumeric or biometric authentication is stored remotely from the access control system.

* * * * *